United States Patent [19]

Järvinen

[11] Patent Number: 4,984,962
[45] Date of Patent: Jan. 15, 1991

[54] METHOD FOR THE FORMATION OF A TRANSPORT UNIT

[75] Inventor: Pekka Järvinen, Nummela, Finland

[73] Assignee: Onninen Oy, Vesme, Finland

[21] Appl. No.: 246,545

[22] PCT Filed: Jan. 5, 1987

[86] PCT. No.: PCT/FI88/00002

§ 371 Date: Sep. 2, 1988

§ 102(e) Date: Sep. 2, 1988

[87] PCT Pub. No.: WO88/05020

PCT Pub. Date: Jul. 14, 1988

[30] Foreign Application Priority Data

Jan. 5, 1987 [FI] Finland .................................. 870016

[51] Int. Cl.$^5$ ................................................ B65G 67/02
[52] U.S. Cl. ................................... 414/786; 414/417; 414/495; 414/498; 414/529; 193/35 SS
[58] Field of Search ............... 414/345, 349, 351, 352, 414/353, 398, 495, 529, 531, 532, 535, 572, 573, 786, 403, 417, 498; 193/35 R, 35 SS, 37

[56] References Cited

U.S. PATENT DOCUMENTS

| | | |
|---|---|---|
| 2,812,080 | 11/1957 | Campos . |
| 2,840,252 | 6/1958 | Weber . |
| 3,011,665 | 12/1961 | Wise . |
| 3,223,259 | 12/1965 | Nicholson ........................ 414/349 |
| 3,337,066 | 8/1967 | Reed et al. ....................... 414/345 |
| 3,548,756 | 12/1970 | Fujioka ......................... 414/351 X |
| 3,578,184 | 5/1971 | Schaich ........................ 414/417 X |
| 3,675,801 | 7/1972 | Larson et al. ..................... 414/417 |
| 3,756,436 | 9/1973 | Lingg ........................... 414/417 X |
| 3,899,092 | 8/1975 | Nordstrom ..................... 414/535 X |
| 3,921,840 | 11/1975 | Julien, Sr. et al. ........... 193/35 SS X |
| 3,945,522 | 3/1976 | Suizu et al. . |
| 3,948,403 | 4/1976 | Johansson ...................... 414/417 X |
| 3,995,760 | 12/1976 | Burgdorf et al. .................. 414/498 |
| 4,049,135 | 9/1977 | Glassmayer .................... 414/399 X |
| 4,077,532 | 3/1978 | Bryan ............................ 414/573 X |
| 4,684,311 | 8/1987 | Dickson-Wright et al. ....... 414/535 |

FOREIGN PATENT DOCUMENTS

| | | |
|---|---|---|
| 0214669 | 3/1987 | European Pat. Off. . |
| 2051909 | 5/1972 | Fed. Rep. of Germany . |
| 2454869 | 5/1976 | Fed. Rep. of Germany . |
| 106967 | 6/1971 | Finland . |
| 60-15306 | 1/1985 | Japan ............................. 193/35 SS |
| 62-175329 | 8/1987 | Japan ................................ 414/398 |
| 446330 | 9/1986 | Sweden . |
| 512346 | 10/1971 | Switzerland . |
| 624361 | 7/1981 | Switzerland . |

OTHER PUBLICATIONS

Japanese Patent Abstract, vol. 9, No. 144(M-392) abstract of JP 60-31445, published Feb. 18, 1985.

Primary Examiner—Robert J. Spar
Assistant Examiner—Robert S. Katz
Attorney, Agent, or Firm—Pollock, Vande Sande & Priddy

[57] ABSTRACT

A method for the formation of a transport unit which includes a bed assembly and a cargo thereupon comprises the following steps of placing a cargo on a first bed of a plate-like structure; positioning a second bed, which has a grid-like structure with a plurality of openings and defines a floor structure for a transport container, on top of a handling mechanism; positioning a transfer device connected with a handling mechanism above the top surface of the second bed inside the interior of the container; carrying the cargo placed on the first bed by transfer mechanisms above the second bed inside the interior of the container; and displacing the transfer device relative to the second bed below its top surface, whereby the first bed along with its cargo is set upon the second bed to be supported and the container is provided with a unitary bottom defined by the first and second beds.

4 Claims, 8 Drawing Sheets

METHOD FOR THE FORMATION OF A TRANSPORT UNIT

BACKGROUND OF THE INVENTION

The present invention relates to a method for the formation of a transport unit.

Prior known from, for example, U.S. Pat. Nos. 4 113 122, 4 425 071 and 3 471 047 and CH patent specification No. 512 346 are equipment and methods for loading a truck or a trailer with stuff carried on forklift pallets or any appropriate platforms either to fill the entire cargo space or a part of it at a time. Also prior known are equipment and methods based on the utilization of various ball or roller delivery beds or tracks, air cushion elements and sliding surfaces, for example, in loading the platform of a truck or a container. These latter methods and equipment have been disclosed, for example, in FI patent application No. 1069/67 and CH patent specification No. 624 361. In addition to the methods described in the above publications, there are available unloading and loading methods for the cargo space of a truck based on a so-called "walking floor" solution made from aluminum strips and on an endless, cargo space-covering conveyor belt whose winding gear is fitted beneath the cargo space. U.S. Pat. No. 3 578 184 discloses a method and apparatus for effecting the unloading and loading of the covered cargo space of a truck at a loading platform by utilizing sets of rollers that are either fixedly installed or can be elevated from platform level.

The prior known methods and equipment are solutions relating exclusively to the cargo spaces of a truck and have often been based on the transport and handling of a special cargo. They are also characterized by the fact that a cargo space carries along expensive cargo unloading and loading gear, extra equipment facilitating cargo handling or by the fact that for proper operation they require specially designed loading and unloading platforms. The methods and equipment are mostly not at all applicable to a large unit cargo shifting from one transport vehicle to another or, for example, the shifting of a true trailerful from a truck to a train or vice versa.

The above leads to a high basic investment bound to a transport vehicle and, furthermore, in some respects the introduction is limited by high terminal investments.

In the prior known methods, almost without exception, the transported dead weight is increased; the ongoing handling equipment, doubled load-bearing structures. In addition to the expensive basic investment, this leads to increasing operating costs.

The prior known methods are primarily intended for handling or carrying either individually packed, boxlike bulk cargo, a great volume/weight ratio, or for carrying some other cargo loaded on various forklift plallets or the like. Outside the cargo space, cargo is conventionally handled as boxes or the like or as forklift pallets and the like. The problems involved in intermediate storing and reloading remain unsolved which is an essential drawback, for example, for international traffic, in which a major cargo unit; a semi- or true trailer, a container, a railway car and the like; must often be intermediately stored either as such or in unloaded condition, loaded aboard a ship and reloaded on a new land transport vehicle at the port of destination.

In the transport of paper, for example, a particular problem today in the handling of rolls of paper is a frequent gripper handling of individual rolls. At the mill and in various stages of a modern transport sequence, the rolls are carried from one transport sequence to another by grabbing a roll with hydraulic grippers fitted to a forklift for squeezing the roll therebetween to facilitate a rather short forklift transfer from one place to another. For example, when unloading rolls from roofed railway cars and when transferring them to an intermediate storage, the presentday practice must often involve two handlings with grippers; a so-called low-masted forklift is used to pick up the rolls out of a railway car one by one to be carried by a larger forklift from loading platform to intermediate storage generally 2 to 4 rolls at a time. The intermediate storage is generally a covered, uninsulated warehouse in the harbor or immediately close by. The rolls are stored on top of each other on the floor.

With today's technique, during the transport of a roll from paper mill to intermediate storage in an export market area, the roll must be contacted 6 to 8 times depending on the types of ships used. Every gripper engagement is a potential cause of roll damage. In addition, transfers of one or 2 to 4 rolls tie in each stage a substantial amount of machinery and labor, which also considerably increases indirect costs; spare parts, maintenance, space and personnel. This requirement caused by paper transport for the machinery of ports is of prime importance at several ports since paper is quantitatively a dominating transit article.

Another drawback in the present techniques is that, due to the statutes and regulations in many countries, a fully loaded 40 ft container cannot be driven on roads because of weight limits. The dead weight of such a container is too high for it to be loaded completely.

SUMMARY OF THE INVENTION

A method of the present invention provides a substantial improvement in the eliminations of the above drawbacks.

The most important advantage offered by the method of the present invention is the possibility of forming a transport unit by means of simple and inexpensive auxiliaries and equipment. The transport unit as such can be economically put in an itermediate storage without unloading it and reclaimed as the same unit. In addition, the method offers a possibility of taking advantage of already existing transport and carrier equipment: for example, trains, forklifts, tractors and interchangeable platform trucks. It can be simply applied to shipping containers.

By means of the method of the present invention it is also possible to lighten the tare weight of a cargo carried by land traffic equipment.

In view of individual applications, the method of the invention has a particular significance in paper transportation, wherein the method reduces the need for handling individual rolls of paper to about a third of what it is at present.

The invention relates also to a bed assembly and a handling apparatus, both usable for applying the method.

The present invention will now be described in detail with reference to the accompanying drawings, the invention being, however, by no means limited to the illustrated details. In the drawings

DETAILED DESCRIPTION OF THE PREFERRED EMBODIMENT(S)

Figure 1:
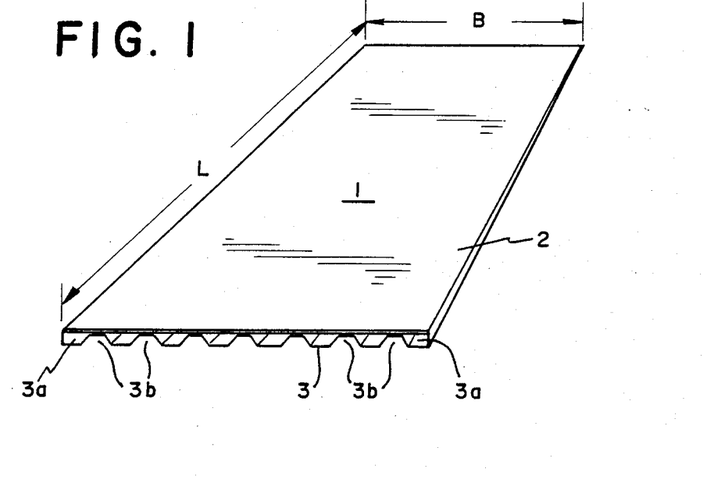
FIG. 1 is an axonometric view of a first bed used in the present invention.

Shown in FIG. 1 is one preferred structure for use as a first bed 1 in a system according to the present invention. The first bed 1 is a rectangular rather thin plate, whose length L and width B are selected for example in such a manner that the first bed 1 fits inside a standard shipping container filling effectively the free inside floor area of the container. In addition to the container-fitting dimensions for first bed 1, also considered in its designing are for example, dimensions based on the dimensions of a railway car and truck platforms as well as on the dimensions of a so-called Euro and railway platform or sections thereof.

Figure 6:
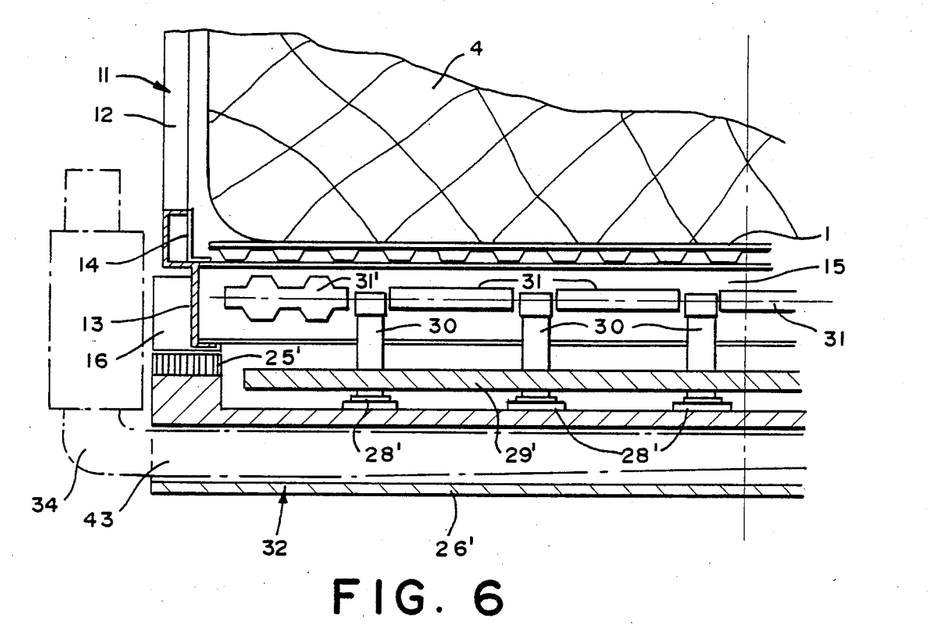
FIG. 6 shows a cross-section of a forklift operated embodiment of a transfer mechanism for a handling apparatus associated with the method, the second bed having a container structure.
Figure 9:
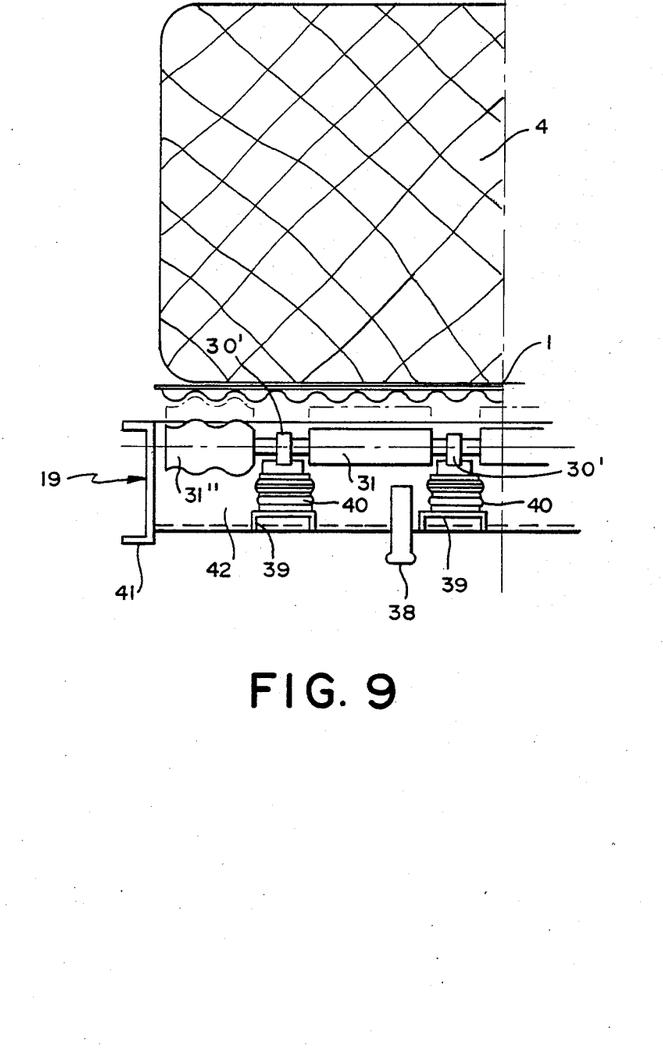
FIG. 9 is a cross-section of the interchangeable platform mechanism of FIG. 8.

In this preferred embodiment first bed 1 consists of a steel top sheet 2 and a base sheet 3, which is assembled of a plurality of sections and appropriately profiled, the sheets being conventionally fastened to each other for example, by welding. As shown in FIG. 1, the base sheet 3 can be shaped at edges 3a in a manner that the edge provides a rigid, continuous guiding surface. Other possible preferred structural alternatives for the base of first bed 1 are illustrated in FIGS. 6 and 9. The profiling patterns shown in the figures are by no means intended to limit the profiling patterns of base sheet 3 or the structure of first bed 1 as such and it should be noted that the structure of first bed 1 can comprise as a part thereof some structural means allowing forklift handling, such as pockets intended for the forks of such a machine. In order to provide extra rigidity, the intermediate space between the top and base sheets 2, 3 of first bed 1 can be foamed with a known technique, for example, with polyurethane, to build a so-called sandwich structure. The first bed 1 can also be made of an artificial material, the appropriate structure and shape being obtained by properly shaping the artificial material. Relative to the transverse direction, the structure of first bed 1 gives it a great longitudinal rigidity. The longitudinal direction is generally understood to be that direction in which, according to the invention, the first bed 1 is transferred or carried by means of later described transfer means, such as rollers 31, 31'. Thus, the profiling on the bottom provides at least a unidirectional corrugation 3b, which serves as a guide means in the transfer.

When the first bed 1 is used in connection with 20 ft containers, some preferred materials include: top sheet of 2 mm steel sheet and base sheet of 3 mm steel sheet.

The shape and dimensions of the profile of base sheet 3 are appropriately selected considering the handling and loading stresses subjected to first bed 1 as well as rigidity, weight and volume.

The edges of first bed 1, within its boundary dimensions, can be conventionally fitted with links or the like required for fastening a cargo 4, whereby the lines and/or net used for tying the cargo can be secured to such links; these have not been illustrated in the figures. The edges, preferably corners of first bed 1 can also be provided with known fastening means for coupling beds together, if necessary; which is not shown in the figures.

Figure 2:
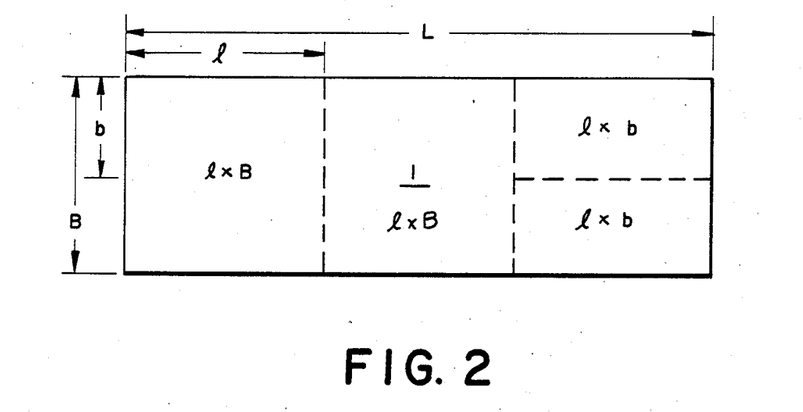
FIG. 2 shows the first bed of FIG. 1 in plan view.

FIG. 2 shows a few possibilities for dividing a container-fitting first bed 1 into sections, sections 1×B and 1×b providing beds that can be handled independently, if necessary. These have a particular significance in the cargo supply and delivery traffic; smaller cargo loads can already be packed and fastened at the shipping end and the cargo handling in a terminal becomes substantially quicker because all it takes is to assemble the smaller beds 1×B and 1×b into an appropriate unit by utilizing the fastening means that are structural components of the beds. The appropriate size can be, for example, the above-mentioned bed size L×B defined by the free floor area of a 20 ft container or some other appropriate size. It should also be noted that two L×B beds 1 can be fastened one after the other to provide a bed corresponding to 40 ft containers. It should also be noted that the profiling of a base sheet 3 for small beds; 1×B, 1×b or Europlatform multiple; can be effected by deep drawing symmetrical cup-shaped stiffeners symmetrically in the sheet. Thus, such a small bed can be moved according to the present invention both in longitudinal and lateral directions and it is possible to combine it functionally with corresponding small, for example, beds into an L×B unit.

Figure 3:
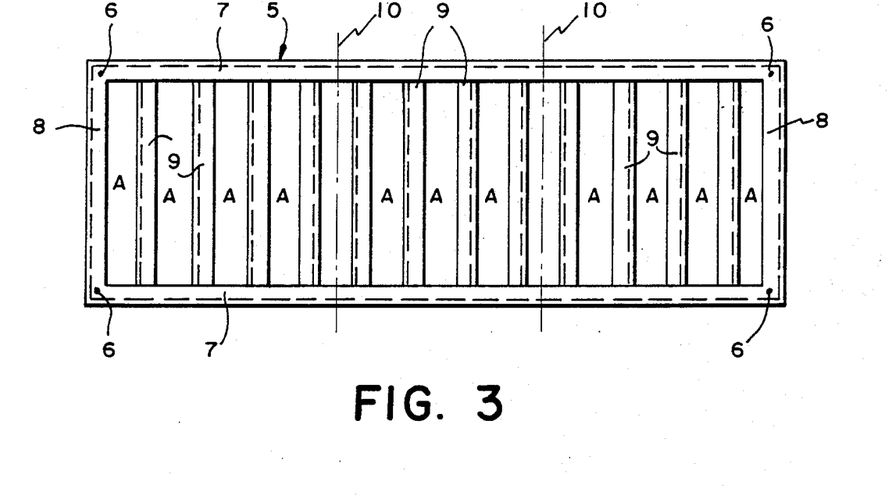
FIG. 3 is a plan view of a second bed used in a method of the invention.

FIG. 3 illustrates a second bed 5 intended for carrying a bed 1 with its cargo 4 in situations explained in more detail later. The main dimensions and structure of second bed 5 are selected in a manner that it can be fitted into cooperation either with a loaded or unloaded first bed 1 or a section thereof.

One preferred structure is shown in FIG. 3 in which the main dimensions of second bed 5 match the floor dimensions of a standard container and its corners are provided with openings 6 whose sizes and relative positions correspond to the engagement openings of container corner pieces. Furthermore, the second bed 5 comprises side beams 7, end beams 8 and cross beams 9, all made of steel and whose dimensions are appropriately selected and which are secured to each other by welding. The structure also includes two forklift pockets 10, each being formed between two adjacent cross beams 9. The structure of second bed 5 corresponds in its size, for example, to the uncovered floor structure of a standard container. The corner pieces used in containers are replaced with a plate structure provided with an opening 6.

Some preferred appropriate dimensions are; side, end and cross beams 7, 8, 9 h=150 mm and s=4 mm U-profiles, the regions of openings 6 reinforced with s=15 mm sheet sections, the regions of forklift pockets 10 reinforced with s=6 mm sheets. The second bed 5 is a so-called skeleton structure and without a floor plywood, plating or planking. Especially the openings remaining in spaces between cross beams 9 facilitate the movement of later more fully described transfer means through second bed 5.

Figure 4:
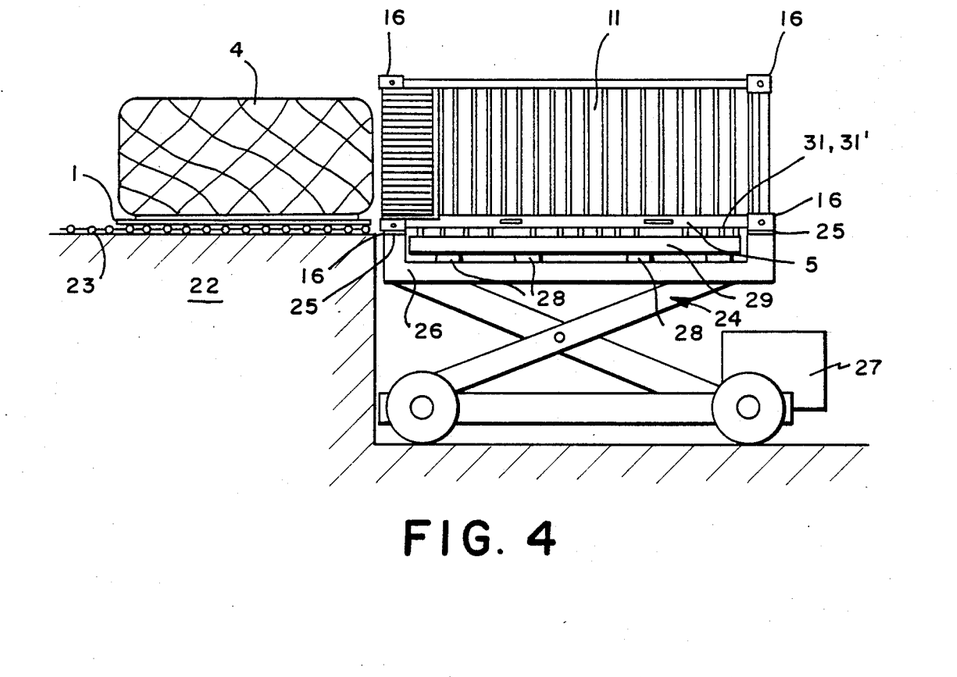
FIG. 4 is a side view of a lift frame for a handling apparatus associated with the present method.
Figure 5:
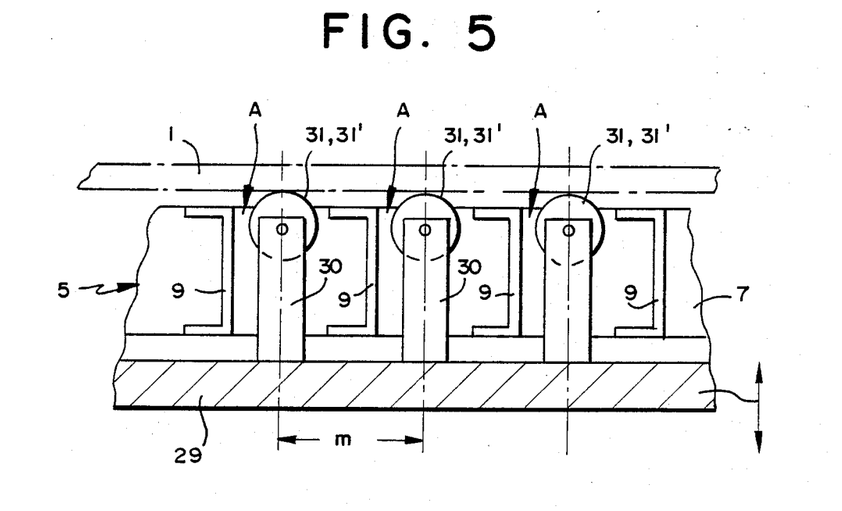
FIG. 5 shows in a sectional view a detail of a roller table, included in a handling apparatus of the invention and fitted with transfer means.

FIG. 4 illustrates a loading platform 22 at a terminal or the like, a conveyor line 23 installed therein and covered by the first bed 1, which is loaded with a cargo 4 corresponding, for example, to the entire payload of a 20 ft container. The cargo 4 is fastened into contact with first bed 1. The conveyor line 23 consists, for example, of arrays of rollers or other appropriate level transfer elements for first bed 1. A container 11 with its container transfer means is mounted upon a movable lift frame 24, used in a method of the present invention and serving as a handling apparatus, so that its lower corner pieces 16 match the corner supports 25 of lift frame 24 fitted with clamping means for locking the container in position. The height of lift frame 24 can be adjusted as desired e.g. with articulated frame technique and it is provided either with its own power unit 27 with its control devices or means for connecting it to an external transfer device, such as a forklift. The corner supports 25 are integral structural components in the platform 26 of the lift frame 24. Furthermore, there is a roller table 29 whose height position is adjustable relative to platform frame 26, for example, by means of hydraulic cylinders 28. That table (FIG. 5) includes braces 30, on which are journalled transfer means serving rollers 31 and 31'. The design and height of braces 30 as well as the size and shape of rollers 31, 31' likewise their relative distance m in FIG. 5 are appropriately selected in a manner that, by lifting roller table 29 with the hydraulic cylinders, the top surface of the rollers 31, 31' can be lifted substantially above the top surface level of a second bed 5 serving as the floor of container 11.

The rollers 31, 31', serving as transfer means (see particularly FIG. 5), a necessary number of them, are mounted on roller table 29 supported by braces 30 preferably in a manner that there are rollers 31, 31' in each open, transverse opening A between cross beams 9 of bed 5 as well as between cross beam 9 and end beam 8 (FIG. 3).

All rollers 31, 31' or a necessary number of them can be set, as desired and prior known, in a controlled rotating motion, whose control is effected either by means of the control devices of power unit 27 or from the control room of an external power engine. As described above, the first bed 1, together with its cargo 4, is carried into container 11 and set in transport position. As rollers 31, 31' are lowered, friction will maintain first bed 1 in its position. This can be further secured by utilizing the fastening means of first bed 1 and the load securing points of container 11.

The roller table 29 can also be embodied so that the relative distance m between the lines formed by rollers 31, 31' can be varied if necessary by constructing said braces 30, together with their rollers 31, 31', to be movable relative to roller table 29. Appropriate selection of the diameter of rollers 31, 31' can be used to provide sufficient clearances and bearing capacity for the rollers. In each array of rollers, the outer surfaces of at least the extreme rollers 31' are shaped to match the profile of the base sheet 3 of first bed 1, whereby those surfaces act as guides for the parallel motion of first bed 1 setting inside the profiled shape.

As for the above-mentioned small or light-duty beds, it is possible to employ lift frames substantially lighter than those described above but provided, however, with characterizing features of a lift frame 24 of the present invention, namely; a vertically adjustable platform frame 26 includes a roller table 29, which is elevation adjustable relative to it and fitted with rollers 31, 31' bearing and carrying the first beds 1. Technically, the same result is also achieved by making each roller or array of rollers elevation adjustable relative to the platform frame.

FIG. 6 illustrates more closely a container 11 used in the application of the method of the invention, constructed according to standard but without floor boarding or planking. FIG. 6 shows a corrugated wall 12 of container 11 as well as a side beam 13, an edge strip 14, a cross beam 15 and a corner pice 16 included in a second bed 5. Instead of the above-described container 11 it is possible to employ in the system any ISO-standardized, container-dimensioned cargo carrier, for example, so-called platform containers constructed without floor covering.

Figure 7:
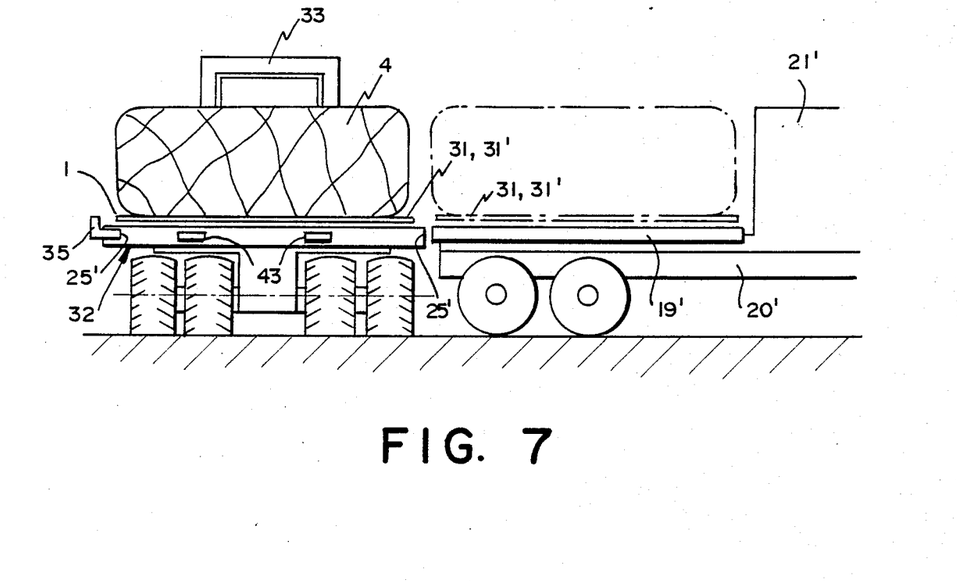
FIG. 7 is a side view of the handling apparatus of FIG. 6 for transferring a cargo loaded on the first bed onto a truck.

In addition, FIG. 6 shows in cross-section a transfer mechanism 32 of the present invention, serving as a handling apparatus, linkable to a forklift 33 and shown in a side view in FIG. 7, the mechanism being functionally connectable to forklift 33 through the intermediary of forklift pockets 43 by means of the forks 34 of a forklift. In FIG. 6, the transfer mechanism 32 comprises a platform frame 26' as described above, corner supports 25', hydraulic cylinders 28', a roller table 29' with its braces 30 and rollers 31, 31'. Hydraulic cylinders 28' are fitted between platform frame 26' and roller table 29'.

In a known manner a forklift 33 can provide a driving force to a presently discussed transfer mechanism 32 and the control equipment is fitted in the cabin of forklift 33. FIG. 7 shows also a limiter 35 included as a functional part in transfer mechanism 32 and provided either at both ends or just one end of transfer mechanism 32. Limiter 35 prevents the overrun of first bed 1 and cargo 4 carried thereon by cutting off the rotating motion of rollers 31, 31' as soon as it is contacted by first bed 1. Limiter 35 is of a known design and, if desired, it can be swung aside and switched off.

It should be noted that the embodiments of a handling apparatus of the invention, such as transfer mechanism 32 as well as a prior described lift frame 24, are capable of handling and carrying the first bed 1 with its cargo 4 either as such, in container 11 or resting on a second bed 5. As a way of example, FIG. 7 illustrates the transfer of bed 1 directly from the position supported by transfer mechanism 32 onto an interchangeable platform 19' without using a second bed 5.

Figure 8:
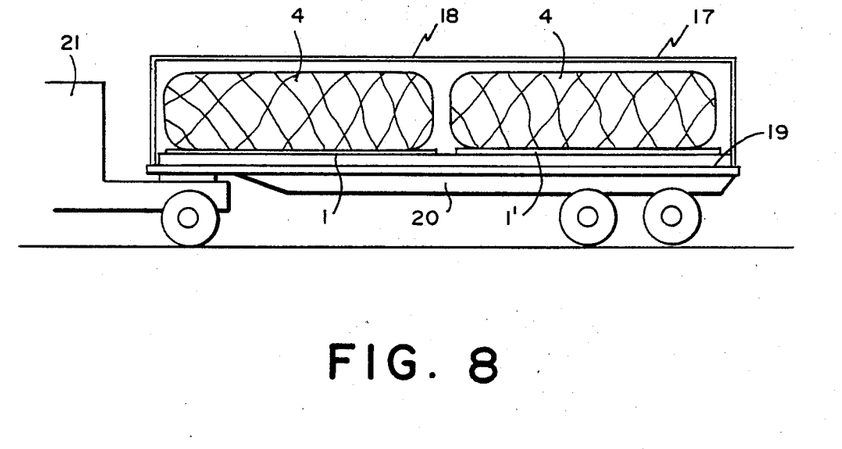
FIG. 8 shows an interchangeable platform mechanism and a semitrailer associated with a method of the present invention in side view and partially cutaways.

FIG. 8 illustrates a semitrailer 17 used in the application of the method of the invention and possibly covered with a covering 18 or uncovered. The chassis 20 of semitrailer 17 is provided with operating mechanisms for interchangeable platforms or the like equipment as well as with an interchangeable platform 19, associated with the application of a method of the invention and serving as a handling apparatus. The operating power for such mechanisms is received from a truck 21. The application of such a method is by no means restricted to the use of semitrailers but, for example, true trailer constructions and platforms built on the chassis of a truck can also serve the discussed purpose. The interchangeable platform 19 is intended to serve as one preferred interchangeable platform alternative for a standard truck or a trailer in order to facilitate further applications of the method of the invention in certain cases. The auxiliaries and functions essential for the application of a method are concentrated outside the chassis of a truck in an interchangeable platform 19 which is inexpensive compared to the price of a truck. The interchangeable platform 19, together with its cargo, is not primarily intended to be lifted onto a truck or the like with conventional interchangeable platform technique but, instead, it is intended for loading, for carrying during the transport and for unloading in horizontal direction a cargo 4 loaded on first beds 1 or the like from a truck or some other means of transport interconnectable with an interchangeable platform 19.

FIG. 9 illustrates a cross-section of an interchangeable platform 19, shown in FIG. 8 and serving as a handling apparatus and whose basic chassis; a side beam 41, a cross beam 42, a main beam 38; corresponds to a known interchangeable platform construction but is appropriately reinforced with profiles 39 and fitted with lift mechanisms 40 and associated braces 30' as well as with rollers 31, 31". Lift mechanisms 40 can be, for example, hydraulic or pneumatic. As desired, the lift mechanisms 40 can be used to lift rollers 31, 31" through the spaces between the skeleton beams of basic chassis 41, 42, 38 above the top surface. Rollers 31, 31" can be set in a controlled rotating motion. Operating power is obtained from a truck or the like and the control equipment is appropriately placed in the cabin or immediately adjacent to interchangeable platform 19. In FIG. 9, the profiled shape of bed 1 matches the shape of the outer surface of the extreme rollers 31" in each array of rollers. The length of interchangeable platform 19 can, in principle, be selected arbitrarily depending on a truck, a semi-or true trailer or some other means of transport; some appropriate, in view of the presently discussed system, preferred lengths are, for example, container lengths and the widths of a railway platform.

An interchangeable platform of the present invention serving as a handling apparatus can also be constructed as railway car embodiments, for example, by providing one car with a plurality of interchangeable platforms one after the other for lateral operation, whereby their unloading and loading can be effected over the side of a car. In the case of a railway car, the interchangeable platforms can be hoisted to their position, for example, by means of cranes and secured in their position by means of known clamping mechanisms.

Figure 10:
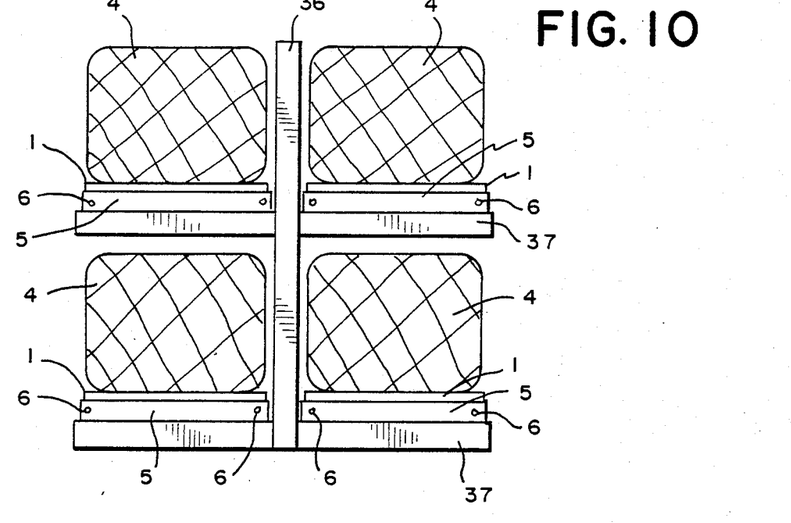
FIG. 10 is a plan view of a storage shelf for transport units of the invention.
Figure 11:
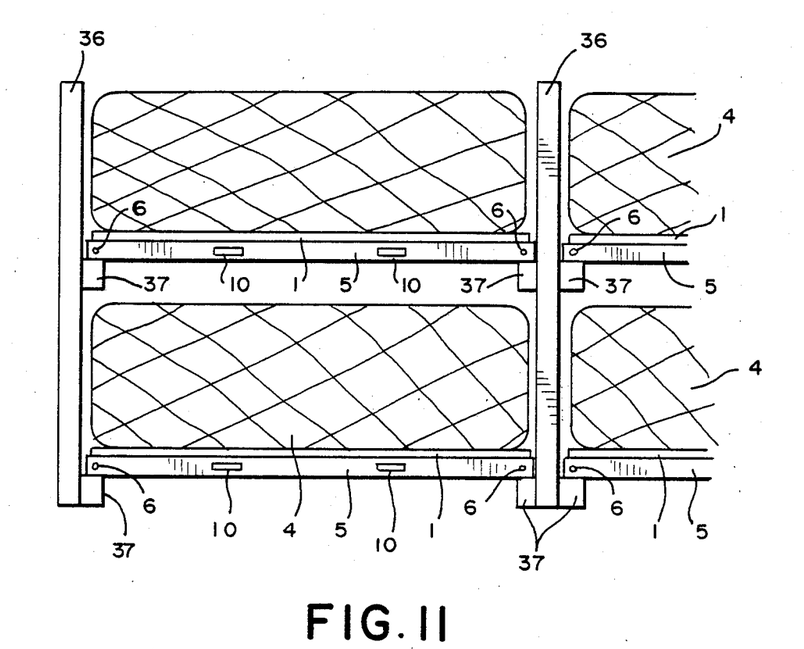
FIG. 11 is a side view of the storage shelf of FIG. 10.

FIGS. 10 and 11 show a transport units storage shelf, whose load-bearing frame consists of columns 36 and appropriately secured, for example, welded cross girders 37, two or more of which can be on top of each other as shown in the figure. The length and relative spacing of cross girders 37 in horizontal and vertical direction are selected in a manner that a second bed 5 together with its cargo 4 can be mounted, as shown in the figures, on top of cross girders 37. In cases where columns 36 are positioned immediately adjacent to a wall, a cross girder 37 can be located asymmetrically only on one side. In the positions corresponding to openings 6 of second bed 5, the cross girders 37 can be fitted with clamp mechanisms for locking them in position on cross girder 37. The second beds 5 serve not only as a transferable load carrier but also as a shelf component in the storage system. The second bed 5 fitted with a first bed 1 with or without a cargo 4 can be inserted in or withdrawn from its shelf position by means of mechanisms, such as a forklift, a crane or a like mechanism, engageable in forklift pockets 10 and/or openings 6 or supporting second beds 5 from below. Columns 36 are conventionally secured to the floor and other necessary structures of a warehouse or the like.

A method of the invention as well as a bed assembly employable therein can be preferably used in general cargo transport, from a production plant via land and sea traffic terminals to a receiver. A sensible size of transport is, however, equal to the size of the smallest preferably employed platform or bed, for example, the size of a Europlatform.

The method of the invention will now be described in more detail by way of an example in the transport of rolls of paper from a paper mill to an export warehouse in an export market area:

The rolls of paper are loaded with a prior known technique, e.g. by means of a forklift, at a plant onto first beds 1 and fastening is secured, for example, by means of a net, lines or by wrapping a bedwise number of rolls in a protective plastic tying a formed cargo 4 into a single unit. This loading onto first beds 1 is effected in a paper mill at the end of a packing line or some other appropriate location.

The loaded first beds 1 with their cargos 4 are handled at the mill on lines like for example a conveyor line 23, whereupon their transfer is accomplished either by external pushing or as a result of the rotating motion of the rollers of conveyor line 23. In addition of cylindrical rolls, a conveyor line 23 made up of arrays of rollers can also include an appropriate number of rollers contacting the bottom of first bed 1, for example, the profiled surface of a base sheet, said rollers maintaining first beds 1 in direction and stabilizing them on the track.

The handling of unloaded beds 1 is effected by means of various hoists, forklifts etc. capable of lifting and carrying them as desired by means of forks or lift members provided at bed fastening points, junction points of corner areas. The handling and carrying of unloaded first beds 1 can also be preferably effected by employing handling equipment or mechanisms of the invention, such as interchangeable platforms 19, 19', a transfer mechanism 32 and a lift frame 24.

Figure 12:
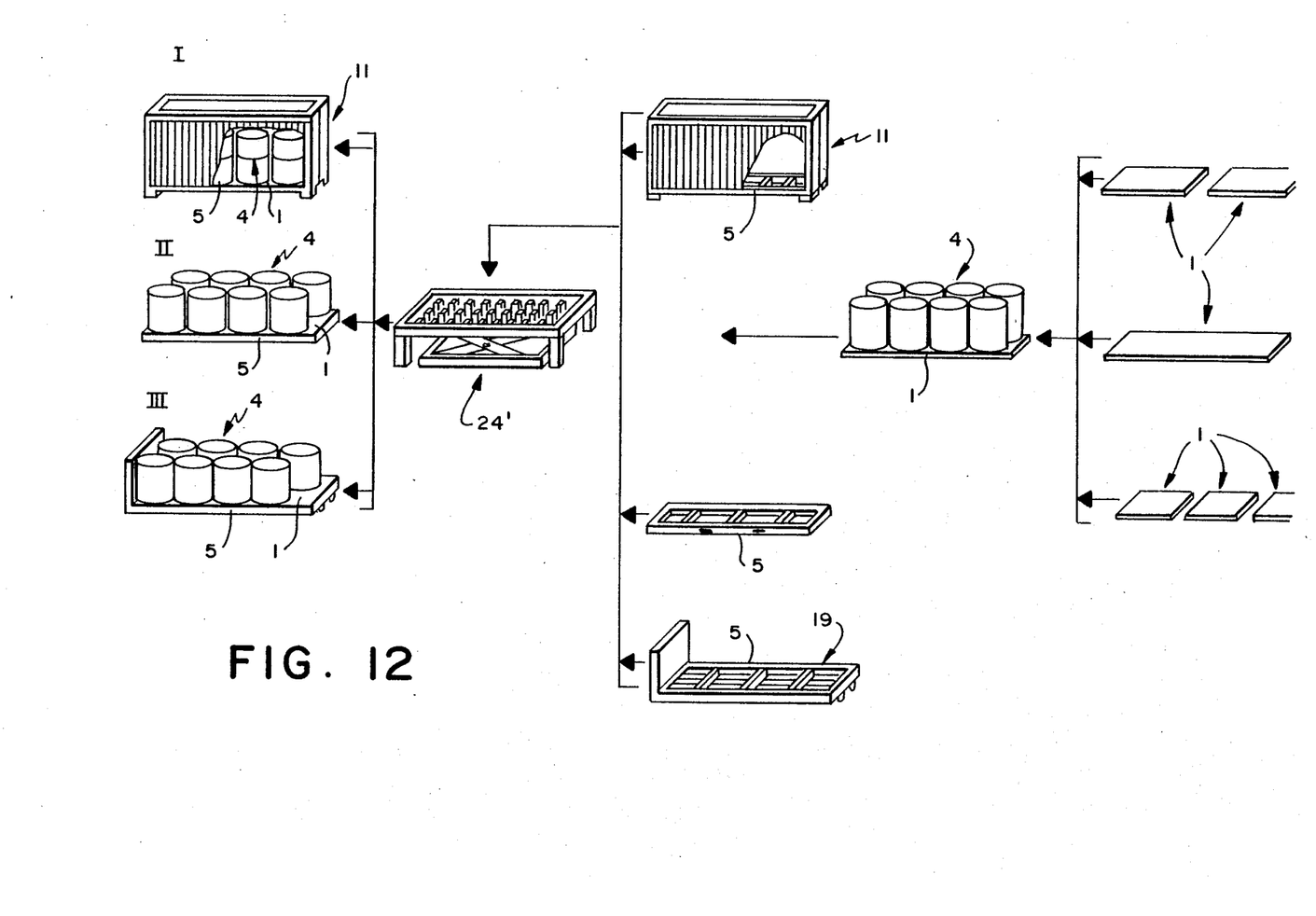
FIG. 12 is a schematical view of the present invention method sequence.

A first bed 1 together with its cargo 4 (FIG. 12) is carried from a conveyor line 23 at a mill either into a container 11 (the floor structure of container 11 corresponds to a second bed 5) or onto a second bed 5 or onto an interchangeable platform 19 (the floor construction of interchangeable platform 19 corresponds to a second bed 5). Container 11, interchangeable platform 19 or second bed 5 is set on a handling apparatus 24'. A handling apparatus shown in FIG. 12 is stationary and the formed alternative transport units I, II, III are transferred from the top of it to a following carrier. If the handling apparatus comprises, for example, a transfer mechanism 23, the first bed 1 and cargo 4 can be carried onto an interchangeable platform 19, 19' or onto a shelf. From a conveyor line 23, the transfer can be effected also directly into a railway car which, as explained earlier, is fitted with mechanisms corresponding to an interchangeable platform 19 and included in a system of the invention.

As transfer is proceeding onto or away from the above-described handling mechanisms 24, 19, 19', 32, the above-mentioned transfer means, such as rollers 31, 31', 31" are lifted to an upper position and their possible rotation is synchronized or otherwise adapted to the advance of conveyor line 23 or a receiving mechanism. When bed 1 with its cargo 4 is properly on top of a handling mechanism 24, 19, 19', 32, the load-bearing rollers 31, 31', 31" are descended to a lower position, the first bed 1 contacting the skeleton base or frame structure of second bed 5 or interchangeable platform 19, 19' and maintaining its position as a result of friction. The necessary extra safety features for mechanisms 5, 19, 19' can be obtained in a known manner by utilizing the above-shown engagement points of bed 1.

In case the handling apparatus comprises a transfer mechanism 32, a necessary number of rollers 31, 31' are, for example, hydraulically locked in a non-rotatable position and these, primarily as a result of friction, maintain the bed 1 in its position, secondarily an additional locking can be achieved by using prior known mechanical auxiliaries which catch the above-described bed engagement points. Bed 1 to be carried, along with its cargo 4, can be transferred by means of a transfer mechanism 32 shown in FIG. 7 within the boundaries of a mill or a terminal; the mechanism can also be used to unload and load trucks 21' or railway cars. In the case of a transfer mechanism 32, a forklift serving as a power unit is substantially perpendicular to the load-transfer direction. In FIG. 7, to truck 21' is linked an interchangeable platform 19', the first bed 1 with its cargo 4 being carried from the top of transfer machanism 32 onto such platform to a position shown in dash-and-dot lines, as explained earlier. By lowering the rollers 31, 31" included in interchangeable platform 19' the bed 1 is brought into contact with the chassis structure of interchangeable platform 19'. The necessary additional safety features are achieved as described above. A container 11 loaded according to the invention is fit for further transportation in international traffic like any standardized cargo carrier; at the receiving end the container 11 can be unloaded just like a conventional prior known container, for example, by means of a forklift since a standardized forklift load has been taken into consideration in dimensioning the bed 1 or the unloading can be effected by using mechanisms of the present invention.

A transport unit 1, 4, 5 formed as described above is suitable to be carried preferably from a mill to a port warehouse or all the way to an intermediate storage in the export market area. A transport unit 1, 4, 5 is loaded by means of a forklift or hoists onto a conventional truck or a railway car and carried to a port. At the port, a second bed 5 along with its cargo is picked up from a truck or a railway car and positioned onto a shelf structure 36, 37, shown in FIGS. 10 and 11 and in which second bed 5 serves as a cargo 4 bearing shelf, according to the invention. Such loaded interchangeable platform 19, 19' or the like together with its cargo is carried by a truck or a train to a port whereat, by utilizing mechanisms of the invention and effecting the above operations in reverse order, it is further unloaded into a container 11, onto a second bed 5 and, as loaded, for example, in a semitrailer 17, it is carried forward by a truck or a ro-ro vessel. The further handling of beds 1 and cargo 4 unloaded into container 11 and onto second bed 5 proceeds as described above.

The unloading of a shelf structure 36, 37 from the intermediate storage at a port is effected by means of a forklift or hoists which carry the transport units either as such or by using the above-described mechanisms 24, 19, 19', 32 of the invention into a ferryboat car or the like, onto a loading platform alongside a dry-freight vessel, into a semitrailer for continued transport.

At the port in the destination market area, the unloading of a ship is a reverse operation compared to loading. The rolls of paper are temporarily stored on shelf structures 36, 37 in a warehouse within the port area by using second beds 5 as shelves or the first beds 1 are unloaded with known mechanisms, for example, gripper-equipped forklifts, and the rolls are forwarded in a conventional manner.

On the basis of what has been described above, a system of the invention involves a rollwise gripper handling two times—in connection with the loading and unloading of bed 1. Transfers from a transport vehicle to another as well as intermediate storage are effected as a large-scale unit.

If a system of the invention is considered as applied only to paper transport, the unloaded first beds 1 will be returned to a paper mill in packages including a plurality of beds. The same applies to second beds 5.

In practice, however, sea-going is a two-way traffic and, for example, a bed assembly 1, 5 provides a container-dimensioned, floor-equipped "flat", the use of which can be exploited in the transport of a return cargo. The same applies to containers 11 which, when completed with bed 1, are in fact standardized sea-going containers.

By utilizing prior known technology, the handling mechanisms 19, 19', 24, 32 used in a system of the invention can be fitted with guides, known, for example, from cassette platforms in gravel carrying and which center the presently discussed mechanisms in a proper relative position in lateral plane. Similar guides can also be used in cooperations of the above-described conveyor lines 23 and handling mechanisms 19, 19', 24, 32.

By selecting the size of beds 1 appropriately and e.g. aluminum for a raw material, a system of the invention can also be applied to the handling and carrying of air cargo. A container 11 is replaced by a corresponding, known air transport container and a second bed 5 by an aluminum-structured uncovered cargo-carrying floor.

I claim:

1. A method for the formation of a transport unit which includes a bed assembly and a cargo placed thereupon, said method comprising the steps of:

placing a cargo on a first bed having a plate-like structure;

providing a transport container having an interior defined by opposed sides, a top wall, an end wall, and a bottom wall defined by a second bed, said second bed having a grid structure with a plurality of openings;

positioning said transport container with said second bed on a top of a handling mechanism;

positioning a transfer means connected with said handling mechanism above the top surface of said second bed inside the interior of said transport container by raising the transfer means through the grid structure of said second bed;

carrying said cargo and said first bed by means of said transfer means above said second bed inside the interior of said transport container; and displacing said transfer means relative to said second bed below its top surface by lowering said transfer means through the grid structure of said second bed, whereby said first bed along with its cargo is set upon said second bed to be supported thereby, whereupon said transport unit is formed by said transport container provided with a unitary bottom defined by said first and second beds.

2. A method as set forth in claim 1, further comprising the step of transferring the transport unit formed by said transport container including said first bed, said cargo and said second bed from the top of said handling mechanism for transport purposes.

3. A method as set forth in claim 1, further comprising the steps of laying said first bed on a conveyor line, placing a cargo on top of said first bed laid on said conveyor line, mounting a second bed at the end of said conveyor line on top of said handling mechanism, and positioning said transfer means in their position above the top surface of said second bed, wherein said transfer means are set substantially at the same level as said conveyor line.

4. A method as set forth in claim 1, whereby said step of carrying said first bed and said cargo onto said second bed is effected by at least partially by using a power unit connected with transfer means.

* * * * *